United States Patent Office 3,347,782
Patented Oct. 17, 1967

3,347,782
METHOD OF STABILIZING PLATINUM GROUP METAL REFORMING CATALYST
Leon M. Capsuto, Woodbury Heights, and Francis E. Davis, Jr., Westville, N.J., assignors to Mobil Oil Corporation, a corporation of New York
No Drawing. Filed Sept. 9, 1963, Ser. No. 307,297
1 Claim. (Cl. 208—138)

The present invention relates to improving the selectivity of platinum-group metal reforming catalysts and, more particularly, to improving the selectivity of platinum-group metal reforming catalysts having an alumina base in conditions of desiccated reforming.

As those skilled in the art know the selectivity of a reforming catalyst is the capability of producing hydrogen and $C_6$ and heavier reformate. Thus, the greater the selectivity of a reforming catalyst the greater the yield of hydrogen and $C_6$ and heavier reformate produced at a predetermined severity of reforming conditions. However, action conditions such that the partial pressure of water vapor in the effluent of the reaction zone, i.e., the effluent of the last reactor in a multi-reactor unit is less than 0.4 millimeter of mercury and preferably less than 0.2 millimeter of mercury.

As disclosed in the application Serial Number 45,827 the cycle life of a platinum-alumina reforming catalyst is substantially improved by reforming under desiccated conditions. However, although by operating under conditions of "desiccated" reforming the on-stream time is substantially increased, nevertheless the selectivity of the platinum-group metal reforming catalyst having an alumina base, i.e., a refractory oxide base having acid sites, decreases with time as clearly shown by the data presented in Table I. It will be observed that this loss in selectivity occurs under desiccated conditions at low reforming pressure, e.g., 200 p.s.i.g. and at high reforming pressure, e.g. 500 p.s.i.g. and with both light and heavy naphthas.

TABLE I

A. $C_6$—250° F. kuwait naphtha, 103.5 $C_{6+}$(R+3) O. N., 200 p.s.i.g.

| On-stream time, days | 5 | 15 | 85 |
|---|---|---|---|
| $C_{6+}$ Reformate, Percent of chg | 58.5 | 56.5 | 54 |
| $H_2$ production, s.c.f.b | 810 | 740 | 600 |
| Loss of Selectivity: | | | |
| $C_{6+}$ Reformate, Percent of chg | Base | 2.0 | 4.5 |
| $H_2$ production, s.c.f.b | Base | 70 | 210 |

B. $C_6$—290° F. kuwait naphtha, 103.5 $C_{6+}$(R+3) O.N., 200 p.s.i.g.

| On-stream time, days | 5 | 13 | 25 | 85 |
|---|---|---|---|---|
| $C_{6+}$ Reformate, Percent of chg | 65 | 62.5 | 61.5 | 60 |
| $H_2$ production, s.c.f.b | 920 | 850 | 790 | 750 |
| Loss of Selectivity: | | | | |
| $C_{6+}$ Reformate, Percent of chg | Base | 2.5 | 3.5 | 5.0 |
| $H_2$ production, s.c.f.b | Base | 70 | 130 | 170 |

C. 190-365° F. kuwait naphtha, 104.5 $C_{6+}$(R+3) O.N., 500 p.s.i.g.

| On-stream time, days | 5 | 10 | 60 | 105 |
|---|---|---|---|---|
| $C_{6+}$ Reformate, Percent of chg | 59.2 | 58.8 | 57.0 | 55.5 |
| $H_2$ production, s.c.f.b | 580 | 555 | 435 | 330 |
| Loss of Selectivity: | | | | |
| $C_{6+}$ Reformate, Percent of chg | Base | 0.4 | 2.2 | 3.7 |
| $H_2$ production, s.c.f.b | Base | 25 | 145 | 250 |

D. $C_6$—290° F. Aramco, 103.5 $C_{6+}$(R+3) O.N., 200 p.s.i.g.

| On-stream time, days | 5 | 13 | 25 |
|---|---|---|---|
| $C_{6+}$ Reformate, Percent of chg | 65 | 62.5 | 61.5 |
| Loss of selectivity: $C_{6+}$ yield percent of chg | | 2.5 | 3.5 |

E. $C_6$—290° F. Aramco, 104.5 $C_{6+}$(R+3) O.N., 500 p.s.i.g.

| On-stream time, days | 5 | 10 | 60 | 105 |
|---|---|---|---|---|
| $C_{6+}$ Reformate, Percent of chg | 59.2 | 58.8 | 57.0 | 55.5 |
| Loss of selectivity: $C_{6+}$ yield, percent of chg | | 0.4 | 2.2 | 3.7 | it is general experience that the selectivity of platinum-group reforming catalysts having a support comprising refractory oxide having acid sites decreases with the time on-stream.

As defined in the copending application for United States Letters Patent Serial Number 45,827 filed July 28, 1960 now abandoned in the name of Leon M. Capsuto desiccated reforming is defined as reforming under re- While two to five percent loss of yield of $C_6$ and heavier reformate appears insignificant, nevertheless it presents a loss of economic importance. On the other hand, operating a low pressure, i.e., less than 400 p.s.i.g., reforming unit for ninety days without a swing reactor economically is advantageous compared to operating a low pressure unit with a swing reactor and regenerating the catalyst in one reactor every two to five days as described in U.S. Patent No. 2,952,611 issued to M. R. Haxton et al. on September 13, 1960. In reforming at high pressure, e.g., 500 p.s.i.g., the cycle life improvement obtained with desiccated reforming permits operation at lower recycle ratios with an important savings in investment and operating costs.

Thus, the operator of a reforming unit employing platinum-group metal reforming catalyst having a sup- caught between the horns of a dilemma. One horn is the reduced capital and operating costs and the other horn is the loss of selectivity when the catalyst has been on-stream more than three days as taught by Haxton et al. (supra).

It is customary to distinguish between the activity of a catalyst and the selectivity of a catalyst. The most readily determined measure of the activity of a platinum-group metal catalyst comprising platinum on refractory oxide support having acid sites is the reforming temperature required at the vapor inlet of the reaction zone, i.e., the vapor inlet of each of a plurality of reactors in a multi-reactor reaction zone, to produce $C_5$ and heavier reformate having a selected predetermined octane rating (Research+3 cc. TEL) appreciably greater than the octane rating of the charge naphtha at a selected liquid hourly space velocity and under a selected total reactor pressure.

On the other hand, the selectivity of a reforming catalyst of the class defined hereinbefore is most readily determined by the volume of $C_6$ and heavier reformate and the volume of hydrogen produced at any selected predetermined octane rating of the reformate at the selected pressure at any selected time in the on-stream cycle. Thus, for example, the activity may be substantially constant for a period of time but the selectivity may decrease.

It has now been discovered that the selectivity of a platinum-group metal reforming catalyst having a refractory oxide support having acid sites can be maintained substantially constant for more than ninety days as the data presented in Table II establishes.

presence of platinum-group metal reforming catalyst comprising 0.6 percent by weight of platinum and 0.7 percent by weight of chlorine on alumina support is achieved by adding to the feed a nitrogen compound which yields ammonia under the "desiccated" reforming conditions and preferably a nitrogen compound yielding ammonia but no water under the "desiccated" reforming conditions. Exemplary of nitrogen compounds yielding ammonia but no water under "desiccated" reforming conditions are the heterocyclic nitrogen compounds pyridine and pyrrole. Simplest of the nitrogen compounds yielding no water under the conditions of "desiccated" reforming is gaseous ammonia, $NH_3$. Exemplary of compounds yielding ammonia and water under the conditions of "desiccated" reforming is hydroxylamine ($NH_2OH$).

To stabilize the selectivity of platinum-group metal reforming catalysts having refractory oxide bases containing acid sites at least two to four and preferably about ten to fifteen parts per million (p.p.m.) by weight of nitrogen as a compound-yielding ammonia ($NH_3$) under the conditions of desiccated reforming are added to the feed. As the data in Table III establish, 2.6 p.p.m. of nitrogen fails to completely stabilize the selectivity of the platinum-group metal reforming catalyst of the aforedescribed class while 7 p.p.m. of nitrogen appears to maintain the catalyst at the higher level of selectivity.

After start-up about five days are required for the unit to line out and come to equilibrium. Accordingly, the yield of $C_6$ and heavier reformate recovered during the fifth day is considered the base yield measuring the selectivity of the catalyst. It will be observed that in ten to fifteen days the catalyst had lost selectivity as measured by a loss of 2 percent in the yield of $C_6$ and heavier reformate. Upon the addition of 6 p.p.m. by weight of nitrogen as pyridine the yield of $C_6$ and heavier reformate and the amount of hydrogen produced returned to the base yield as

TABLE II $C_6$—250° F. kuwait naphtha, 103.5 $C_{6+}$ (R+3) O.N., 200 p.s.i.g.

| On-Stream Time, Days | 5 | 30 | 40 | 60 | 75 | 85 | 110 | 136 |
|---|---|---|---|---|---|---|---|---|
| $C_{6+}$ Reformate, Percent of charge | 58.5 | 59.0 | 58.5 | 57.5 | 58.8 | 57.8 | 56.5 | 56.5 |
| Hydrogen produced per barrel of feed | 810 | 850 | 820 | 710 | 830 | 707 | 730 | 740 |

TABLE III

Feed: $C_1$ to 250° F. EBP Fraction of Kuwait Naphtha.
Catalyst: 0.6 wt. percent Pt. and 0.7 wt. percent Chorine on eta Alumina.
Nitrogen Compound: Pyridine.

| Catalyst Age, Days | 5 | 15 | 30 | 40 | 60 | 75 | 85 | 85 | 105 | 110 |
|---|---|---|---|---|---|---|---|---|---|---|
| Nitrogen in Naphtha, p.p.m. by wt | Nil | Nil | 6.0 | 6.0 | 2.6 | 6.9 | 7.1 | Nil | Nil | 10.6 |
| Octane Number (R+3 cc. TEL) of $C_{6+}$ Reformate | 103.5 | 103.5 | 103.5 | 103.5 | 103.5 | 103.5 | 103.5 | 103.5 | 103.5 | 103.5 |
| $C_{6+}$ Reformate, percent by volume of charge | 58.5 | 56.5 | 59.0 | 58.5 | 57.5 | 58.8 | 57.8 | 54.0 | 54.0 | 56.0 |
| Δ percent volume $C_{6+}$ Reformate | | −2.0 | +0.5 | 0.0 | −1.0 | +0.3 | −0.7 | −4.5 | −4.5 | −2.5 |
| $H_2$ Produced/bbl., s.c.f. | 810 | 740 | 850 | 820 | 710 | 830 | 770 | 600 | 600 | 730 |
| Δ $H_2$ Produced/bbl., s.c.f. | Base | −70 | +40 | +10 | 100 | +20 | −40 | −210 | −210 | −80 |

It is manifest, if for reasons explained hereinafter the yield of $C_{6+}$ reformate at sixty days on-stream is disregarded, the average yield of $C_{6+}$ reformate is 58.5%+0.5 and −0.7 percent and the production of hydrogen averaged 816 s.c.f. per barrel +34 and −46 s.c.f./b.

The stabilization of the selectivity as measured by the yield of $C_6$ and heavier reformate ($C_{6+}$ reformate) when operating under "desiccated" reforming conditions in the measured on the thirtieth day. The yield of $C_6$ and heavier reformate and the production of hydrogen were stabilized during the period from the thirtieth to the fortieth day while 6 p.p.m. of nitrogen as pyridine were being added to the feed. However, when the amount of nitrogen added to the feed was reduced to 2.6 p.p.m. from 6.0 p.p.m. of nitrogen, the selectivity of the catalyst declined as measured by the yield of $C_6$ and heavier reformate and the amount of hydrogen produced on the sixtieth day. The selectivity of the catalyst was restored by increasing the dosage of pyridine from the equivalent of 2.6 p.p.m. of nitrogen to 6.9 p.p.m. of nitrogen as measured by the yield of $C_6$ and heavier reformate and the hydrogen produced on the seventy-fifth day. The selectivity of the catalyst was maintained through the eighty-fifth day by the continued addition of pyridine in amount equivalent to 7.1 p.p.m. (1 p.p.m. of nitrogen is equivalent to 5.64 p.p.m. of pyridine). It is now clear why the yield of $C_6$ and heavier reformate at sixty days on-stream was disregarded when discussing proof of stabilization of selectivity hereinbefore.

The introduction of nitrogen into the reaction zone during reforming is not novel. This is clear from the fact that U.S. Patent No. 2,849,377 issued to H. B. Ogburn et al. on August 26, 1958, for a method of obtaining maximum isomer production when catalytically reforming a hydrocarbon fraction boiling within the gasoline-kerosine range. These patentees postulate that the temperature for maximum isomer production at high selectivity is of less severity than is the reaction temperature for the maximum production of aromatics. The patentees accordingly teach to increase the reaction temperature for maximum isomer production at high selectivity in the direction of the severity of the reaction temperature for producing maximum aromatics and conducting the reforming process in the presence of at least one nitrogen compound from the group consisting of ammonia and compounds which will yield ammonia without deposition of a solid residue on the catalyst in an amount sufficient to permit an increase in the reaction temperature applicable to maximum isomer production at the desired selectivity and increasing the reaction temperature within the range of the reaction temperature for the maximum production of aromatics. The present process differs from that described by patentees Ogburn et al. in that (1) the patentees are not concerned with and do not discuss the moisture content of the reaction zone vapors as measured at the effluent of the reaction zone, i.e., in a three reactor unit at the outlet of the third reactor, (2) the patentees specifically recommend the use of ammonium hydroxide without any provision for removing water to maintain a partial pressure of water less than 0.4 millimeter in the effluent of the reaction zone, (3) the patentees teach to add 0.06 percent by weight of nitrogen as ammonium hydroxide or six parts per ten thousand parts of feed, (4) the patentees teach that a maximum temperature of 950° F. is to be employed. The present method of stabilizing the selectivity of platinum-group metal catalyst having a support of refractory oxide containing acid sites provides for employing a nitrogen compound yielding ammonia in the range of 2 p.p.m. to 100 p.p.m. and a temperature in the range of about 900° F. to about 1,050° F. while maintaining a partial pressure of water in the effluent of the reaction zone less than 0.4 millimeter and preferably less than 0.2 millimeter of mercury.

In U.S. Patent No. 2,944,090 issued July 5, 1960, to J. A. Guthrie, a process for increasing the quantity of benzene which can be produced from $C_6$ naphthenes when using as a catalyst platinum supported on a halogen-containing alumina is described. The patented method consists in contacting a saturated fraction comprising methyl cyclopentane in the presence of added hydrogen and from 3 to about 8.5 parts per million of ammonia based on the hydrocarbons. The patented method differs from the present method in that (1) the patented process is not concerned with the partial pressure of water vapor in the final effluent of the reaction zone, i.e., the effluent of the last reactor of a plurality of reactors, (2) the patentee finds that the addition of ammonia in the range of 2.5 to 7 p.p.m. of nitrogen increases the conversion of $C_6$ naphthenes to benzene. In contrast it has been found that in stabilization of the selectivity of a reforming catalyst of the herein defined class the increase of the $C_{6+}$ yield appears to be evenly distributed among $C_{6+}$ paraffins, toluene, and $C_8$ aromatics with the benzene yield remaining constant.

In U.S. Patent No. 2,956,945 issued October 18, 1960, and in the corresponding British Patent No. 888,832 published February 7, 1962, R. Fleming et al., teach that the addition of ammonia or a nitrogen compound yielding ammonia in the range of 2 to 100 parts per million or 1.647 to 82.35 p.p.m. of nitrogen to a gasoline boiling range hydrocarbon fraction substantially free of naphthenes, i.e., containing 10 percent or less by volume of naphthenes, produces a higher octane number product at a given yield than is obtainable by a conventional reforming process. This patented process differs from the present method of stabilizing the selectivity of a platinum-group metal reforming catalyst of the hereinbefore defined class in that (1) Fleming et al. do not limit the partial pressure of water vapor in the final effluent of the reaction zone to less than 0.4 millimeter of mercury, (2) Fleming et al. limit the naphthene content of the feed to 10 percent by volume or less whereas the present method of stabilizing the selectivity of a platinum-group metal reforming catalyst of the hereinbefore defined class is not so limited, (3) Fleming et al. find that when ammonia is added to the feed the reformate is less aromatic than that produced without ammonia whereas in the present method the increased yield of $C_{6+}$ reformate is evenly distributed among $C_{6+}$ paraffins, toluene, and $C_8$ aromatics with the benzene yield remaining constant, (4) the patentees teach that for their purpose the ammonia is added just prior to the last catalyst case in a multicase, i.e., multi-reactor unit for if added earlier the ammonia will have an adverse effect upon the yield-octane relation. In contrast, to stabilize the selectivity of a platinum-group metal reforming catalyst of the hereinbefore identified class in accordance with the present process the nitrogen compound yielding ammonia under "desiccated" reforming conditions is mixed with the feed prior to the first case or reactor of a multicase or multi-reactor unit.

Other U.S. patents describing the addition of ammonia or nitrogen compounds yielding ammonia in a reforming reaction are: Nos. 2,758,064; 2,872,494; 2,906,699; 2,911,356; 2,925,375; 2,935,464; and 2,980,605.

Accordingly, the present invention provides a method of stabilizing the selectivity of platinum-group metal reforming catalyst having a refractory oxide support containing acid sites when reforming a light naphtha fraction comprising naphthenes and paraffins having an initial boiling point of about 140° to about 250° F. at a pressure in the range of 100 to 700 p.s.i.g. and preferably at a pressure in the range of 200 to 500 p.s.i.g. in the presence of hydrogen at a liquid hourly space velocity in the range of 0.5 2 v./hr./v., at a hydrogen-to-naphtha mol ratio of 3 to 20, employing at least one reactor and preferably at least two reactors all of which are normally on-stream, i.e., there is no swing reactor and all of the catalyst in all of the reactors normally is on-stream, and vapor inlet temperatures dependent upon the activity of the catalyst and the target octane rating (Research+3 cc. TEL) of the $C_5$ and heavier reformate in the range of 98 to 113 characterized by admixing with the naphtha feed prior to entry into the reaction zone, i.e., prior to entry into the first reactor of a plurality of reactors each containing a static bed of platinum-group metal reforming catalyst of the class hereinbefore defined, ammonia, or at least one organic compound containing nitrogen which under reforming conditions yields ammonia, and preferably an organic nitrogen compound yielding ammonia and no water, in a concentration of at least 2 p.p.m. of ammonia, preferably 10 to 15 p.p.m. of ammonia and up to 100 p.p.m. of ammonia, and maintaining a partial pressure of water in the final effluent of the reaction zone, e.g., the effluent of the last reactor in a multi-reactor unit, less than 0.4 millimeter and preferably less than 0.2 millimeter of mercury. As the activity of the catalyst decreases with on-stream time the vapor inlet temperature of the reactor or reactors is raised to not higher than about 1,050° F. At temperatures above 1,050° F. the advantages accruing from the admixture of ammonia and the consequent stabilization of the selectivity of the catalyst diminsh due to the thermal reforming which occurs at temperatures higher than 1,050° F.

The present method of stabilizing the selectivity of platinum-group metal reforming catalysts is also effective when reforming paraffinic heavy naphthas employing high pressures, e.g., 400 to 700 p.s.i.g. (in contrast to low pressures in the range of 100 to 400 p.s.i.g.) as described hereinafter.

In a multireactor reaction zone the hereinbefore identified class of platinum-group metal reforming catalyst is distributed evenly among all of the reactors or cases or is distributed unevenly. That is to say, the first reactor can be charged with the amount of catalyst required to produce a maximum difference between the temperature of the vapors entering the first reactor or case and the temperature of the vapors leaving the first reactor or case as described in U.S. Patent No. 2,946,737, and the balance of the catalyst required to provide the predetermined liquid hourly space velocity charged evenly or otherwise to the balance of the reactors or cases. On the other hand, the first reactor can be operated in a manner approaching isothermicity under which conditions the amount of catalyst in the first reactor or case is less than 2 tons per 10,000 barrels of naphtha treated per day as described in copending application for United States Letters Patent Serial No. 109,025 filed May 10, 1961, now abandoned, in the name of George J. Weidenhammer. Thus, while the overall liquid hourly space velocity, i.e., the ratio of the barrels of naphtha treated per hour to the total barrels of catalyst contacted in all of the reactors or cases in the reaction zone is in the range of 0.5 to 2, the liquid hourly space velocity in any reactor or case is a multiple of the overall liquid hourly space velocity and can be the same for all reactors or cases or different for each reactor or case or the same for two or more reactors or cases and different for one case.

As described in the copending application for United States Letters Patent Serial No. 45,827 filed July 28, 1960, in the name of Leon M. Capsuto "desiccated" reforming is reforming in which the partial pressure of water vapor in the effluent of the reaction zone, i.e., the effluent of the last reactor of a multi-reactor reforming unit, does not exceed 0.4 millimeter of mercury and preferably is in the range of 0.05 to 0.2 millimeter of mercury. Furthermore, as stated in application Serial No. 45,827 there are three sources of water, to wit: the charge naphtha, the undried recycle gas, and the moisture of the catalyst. When the charge naphtha contains 15 p.p.m. (part per million) by weight of water, the water in the charge naphtha contributes about 0.08 millimeter of mercury partial pressure of water vapor at 200 p.s.i.g. This partial pressure of water vapor is increased to about 0.5 to 2.0 millimeter of mercury partial pressure of water vapor at 200 p.s.i.g. by the water vapor in undried recycle gas. The catalyst also contributes to the concentration of water vapor in the effluent of the reaction zone until the catalyst is in equilibrium with the moisture content of the reaction zone vapors. Consequently, as described in application Serial Number 45,827 it is preferred to "condition" particle-form solid platinum-group metal reforming catalyst having a refractory oxide support containing acid sites in the manner described thereport. However, the total amount of water introduced into the reaction zone from all sources should not exceed 0.4 millimeter and preferably should be in the range of 0.05 to 0.2 millimeter of mercury. Consequently, the degree to which the moisture content of any of the three sources of water, i.e., the naphtha feed, the recycle gas, and the catalyst is reduced grossly is dependent upon the moisture content of the other two. Thus, it is relatively easy to dry naphtha to a moisture content of 10 to 15 p.p.m. by weight of water in commercial quantities. At a hydrogen-to-naphtha recycle ratio of 7:1 this amount of water will build-up to produce at equilibrium a partial pressure of water of about 0.5 to 2.0 millimeters of mercury of 200 p.s.i.g. Accordingly, the charge naphtha is dried to contain less than 10 p.p.m. by weight of water by contact with any suitable desiccant such as the crystalline aluminosilicates generally referred to as molecular sieves and having pores about 4 to 5 Angstroms in diameter, silica gel, and the like. The recycle gas is dried to a moisture content not greater than 5 p.p.m. by volume of water. The catalyst is dried, while maintaining maximum surface area, to a moisture content not more than 1.1 percent greater than the moisture content of said catalyst after ignition for 48 hours at 1250° C. While it is preferred to dry the catalyst to obtain "conditioned" catalyst as defined in application Serial Number 45,827 it is recognized that after several days on-stream the water on the catalyst equilibrates with the water in the catalyst environment and the water content of the recycle gas drops to a level dependent upon the moisture content of the feed naphtha and the temperature of the liquid-gas separator in which the separation of the recycle gas, i.e., gas comprising hydrogen, and $C_1$ to $C_3$ hydrocarbons, from the raw reformate, i.e., comprising $C_4$ and heavier hydrocarbons is made. Hence, when willing to accept the loss in yield for five or six days at the beginning of an on-stream period, and/or a shorter cycle life, the catalyst need not be conditioned. In other words, as described in the co-pending application Serial Number 45,827, one or more of the sources of water, viz: catalyst, recycle gas, and charge naphtha is or are treated to reduce the water content thereof to provide a partial pressure of water in the effluent of the reaction zone, i.e., the effluent of the tail reactor or case of a multi-reactor or case reforming unit, not in exces of 0.4 and preferably in the range of 0.05 to 0.2 millimeter of mercury at 200 p.s.i.g. As more fully described in co-pending application Serial Number 45,827 and incorporated in the present application by reference herein thereto.

In general, the present method of stabilizing the selectivity of particle-form solid platinum-group metal reforming catalyst having a refractory oxide support containing acid sites, comprises contacting charge naphtha containing innocuous concentrations of sulfur, nitrogen, and arsenic, i.e., not more than 20 p.p.m. of sulfur, not more than 1 p.p.m. of nitrogen and not more than $1/10^9$ parts of arsenic, i.e., 1 p.p.b. of arsenic with particle-form solid platinum-group metal reforming catalyst comprising platinum-group metal on refractory oxide support having acid sites at an overall liquid hourly space velocity in the range of 0.5 to 5 or 150 in a single isothermal reactor dependent upon the activity of the aforesaid platinum-group metal reforming catalyst and the target octane rating (Research+3 cc. TEL) of the $C_5$ and heavier reformate under "desiccated" reforming conditions such that the partial pressure of water vapor in the effluent of the reforming reaction zone, i.e., in the effluent of the tail reactor of a multi-reactor reforming unit, does not exceed 0.4 millimeter and preferably is in the range of 0.05 to 0.2 millimeter and admixing with the influent of the reforming reaction zone, i.e., the influent of the head reactor of a multireactor reforming reaction zone, a nitrogen-containing compound yielding ammonia ($NH_3$) in the reaction zone and preferably a nitrogen-containing compound yielding ammonia ($NH_3$) but no water in the reaction zone in amount to provide a concentration of ammonia ($NH_3$) in the feed in the range of two to one hundred, preferably ten to fifteen p.p.m. of ammonia ($NH_3$). Maintaining vapor inlet temperature at the vapor inlet of each reactor in a multi-reactor reaction zone in the range of 900° to 1050° F. dependent upon the liquid hourly space velocity employed and the target octane rating (Research+3 cc. TEL) of the $C_5$ and heavier reformate produced in the range of 98 to 113, continuing to admixing said nitrogen-containing compound with said influent of the reaction zone in amount sufficient to maintain the selectivity. Alternatively, larger amounts of nitrogen-containing compound can be admixed at intervals when necessary to maintain the selectivity. Thereby, on-stream periods in excess of sixty days without substantial loss of selectivity at pressures in the range of atmospheric to 500 p..i.g. are obtained when producing $C_5$ and heavier reformate having an octane rating in the range of 98 to 113 (Research+3 cc. TEL).

Exemplary of the present method of stabilizing the selectivity of particle-form solid platinum-group metal reforming catalyst comprising platinum-group metal on refractory oxide support having acid sites is the reforming of the $C_6$ to 250° F., (EBP) fraction of Mid-Continent naphtha under "desiccated" reforming conditions and in the presence of about ten to about twenty p.p.m. by weight of ammonia entering the reactor, at a pressure of 200 p.s.i.g., at a hydrogen-to-naphtha recycle ratio of 7:1, and at an overall liquid hourly space velocity of 0.8 to produce $C_5$ and heavier raw reformate having an octane rating (Research+3 cc. TEL) in the range of 103 to 111.

While it is preferred to employ three adiabatic reactors charged with the total amount of catalyst required to produce the predetermined overall liquid hourly space velocity as few as two adiabatic reactors or first "isothermal" reactor and one or more adiabatic reactors can be used. For the purpose of this illustration a unit comprising a head, an intermediate, and tail adiabatic reactors will be described having one-third of the total catalyst in each of the three reactors.

The present method of stabilizing the selectivity of the hereinbefore defined class of platinum-group metal reforming catalysts is applicable to the reforming of naphthas containing naphthenes or substantially free of naphthenes, i.e., mixture comprising paraffins and naphthenes containing as little as ten percent by volume of naphthenes and as much as sixty-five percent by volume of naphthenes. However, presently it is preferred to treat mixtures comprising about 15 to about 45 percent by volume of naphthenes and the balance predominantly paraffins.

Where anhydrous ammonia is available at an economically attractive price, anhydrous ammonia can be used as the nitrogen-containing compound. Otherwise organic nitrogen-containing compounds such as pyridine, pyrrole, hydrazine, and the like can be used. Nitrogen-containing compounds such as hydroxylamine, alkylanolamines and other nitrogen-containing compounds producing not only ammonia but also water in the presence of hydrogen and the platinum-group metal reforming catalyst can be used at the expense of impaired catalyst performance and increased drying facilities for drying the recycle gas and/or the charge naphtha to maintain the partial pressure of water vapor in the final reaction zone effluent at a level not in excess of 0.4, preferably 0.05 to 0.2 millimeter of mercury.

For ease of control of the amount of ammonia entering the reaction zone it is preferred to reduce the nitrogen content of the charge naphtha when necessary to not more than one p.p.m. by weight.

Thus, the $C_6$ to 250° F. (EBP) fraction of Mid-Continent naphtha having the following composition:

Hydrocarbon class:
- Paraffins _____vol. pct__ 53
- Naphthenes _____vol. pct__ 44
- Aromatics _____vol. pct__ 3
- Others _____vol. pct__ nil
- Nitrogen, p.p.m. _____less than__ 1
- Sulfur, p.p.m. _____less than__ 10 admixed with hydrogen-containing recycle gas to provide a charge mixture comprising hydrogen and naphtha in a mol ratio in the range of 1 to 10 mols of hydrogen per mol of naphtha and preferably in the range of 5 to 9 mols of hydrogen per mol of naphtha is heated to a temperature to provide at the vapor inlet of the head reactor a reforming temperature in the range of about 900° to about 1,050° F. Nitrogen-containing compound such as ammonia, pyridine, pyrrole, hydrazine and, in general, any nitrogen-containing compound yielding ammonia ($NH_3$) in the presence of platinum-group metal reforming catalyst and hydrogen and preferably not yielding water is admixed with the naphtha and/or the charge mixture prior to entry of the charge mixture into the reaction zone, i.e., the head reactor in amount to provide a total concentration of ammonia ($NH_3$) in the charge mixture of at least two and preferably at least ten p.p.m. by weight based on the charge naphtha depending on the severity of reaction conditions as measured by the octane rating of the $C_5$ and heavier reformate, catalyst age, charge stock and the like factors. However, concentrations in excess of the equivalent of one hundred p.p.m. by weight of ammonia appear to yield diminishing returns. The charge mixture and admixed nitrogen-containing compound flow downwardly through the head reactor to the outlet thereof. Since the temperature of the effluent of an adiabatic head reactor is usually lower than the reforming temperature required by the space velocity and the activity of the catalyst to produce reformate of predetermined octane rating, the effluent of the head reactor, designated head effluent is reheated to a temperature to provide at the vapor inlet of the intermediate reactor (usually an adiabatic reactor) a reforming temperature in the range of 930° to 1,050° F. dependent upon space velocity and catalyst activity to produce reformate of the required octane rating. The reheated head effluent flows downwardly through the intermediate reactor to the outlet thereof and is reheated to a temperature to provide a reforming temperature at the vapor inlet of the tail reactor in the range of 930° to 1,050° F. dependent upon space velocity, catalyst activity, and predetermined octane rating of the raw reformate, i.e., $C_4$ and heavier reformate. The reheated intermediate effluent flows downwardly through the tail reactor to the outlet thereof. The final effluent, i.e., the effluent of the tail reactor, is cooled by indirect heat exchange with the charge naphtha and finally by indirect heat exchange with water to a temperature at which $C_4$ and heavier hydrocarbons condense at the existing pressure. Usually, the final effluent is cooled to a temperature in the range of 80° to 100° F. dependent upon the volume and temperature of the cooling water. However, the lower the temperature at which the $C_4$ and heavier hydrocarbons are condensed, the lower the moisture content of the separated reformer gas, the lower the moisture content of the recycle gas and the less the load on the desiccant used to dry the recycle gas to maintain the partial pressure of water in the final effluent not higher than 0.4 and preferably in the range of 0.05 to 0.2 millimeter of mercury.

Illustrative of the stabilization of the selectivity of platinum-group metal reforming catalyst at 200 p.s.i.g. by admixture of nitrogen-containing compound yielding ammonia in the presence of said catalyst and hydrogen under "desiccated" reforming conditions are the data presented in Table IV.

TABLE IV

Feed: $C_6$ to 250° F. (EBP) fraction of Mid-Continent Naphtha (44% of naphthenes).
Catalyst: 0.6 percent by weight of platinum, 0.7 percent by weight of chlorine on eta alumina support.
Reaction Conditions:
 Pressure, p.s.i.g., 200.
 Liquid Hourly Space Velocity, v./hr./v., 0.8.
 Hydrogen-to-Naphtha Mol ratio, 7/1.
 Temperature to produce, 105 $C_{5+}$(R+3) O.N.

| Days on stream | 5 [2] | 10–16 | 19–38 | 40–54 |
|---|---|---|---|---|
| $NH_3$ in naphtha p.p.m. by wt.[1] | Nil | Nil | 10–20 | Nil |
| Yields at 105 $C_{5+}$ (R+3) O.N. $C_{6+}$, percent charge | 59.5 | 56 | 60 | 54–55 |
| $H_2$, s.c.f./b | 1,130 | 1,000 | 1,150 | 880 |
| $H_2$, Purity, Mol percent | 75.5 | 71.5 | 76 | 66 |
| $C_5$'s, vol. percent charge | 10 | 11.5 | 10.5 | 11.5 |
| $C_4$'s, vol. percent charge | 10.5 | 12.5 | 10 | 12.5 |
| $C_1$ to $C_3$, wt. percent charge | 13.5 | 15.5 | 12.5 | 16.5 |

[1] Pyridine added to charge mixture.
[2] Catalyst thereafter partially coked, accelerated aging.

From these data it is to be observed that deposition of coke on the catalyst produces a loss in yield (3.5% yield of $C_{6+}$, 130 s.c.f./b. of hydrogen and 4 percent in the purity of the hydrogen). The presence of 10 to 20 p.p.m. of ammonia counteracts the effect of the coke and restores the yields to the high level obtained with uncoked catalyst. Withdrawing the ammonia produces a loss of yields to even lower levels than were obtained after the catalyst was coked.

Illustrative of the stabilization of the selectivity of platinum-group metal reforming catalyst at 200 p.s.i.g. by admixture of nitrogen-containing compound yielding ammonia in the presence of said catalyst and hydrogen under "desiccated" reforming conditions are the data set forth in Table V.

hydrogen produced and the purity of the recycle gas were about 2 percent, 140 s.c.f./b., and 7 percent greater respectively than after 105 days on-stream without the addition of ammonia.

From these data it is manifest that the admixture with the charge mixture of at least six, preferably at least ten, p.p.m. of ammonia by weight based on the charge naphtha stabilizes the selectively of the particle-form solid platinum-group metal reforming catalyst comprising platinum-group metal on refractory oxide support having acid sites at substantially constant severity as measured by the yield of $C_{5+}$ or $C_{6+}$ reformate and an octane rating (Research+3 cc. TEL) higher than the octane rating of the charge naphtha, the standard cubic feet (s.c.f.) of hydrogen produced per barrel of charge naphtha, and the

TABLE V

Feed: $C_6$–250° F. fraction of Kuwait naphtha (17–22% naphthenes).
Catalyst: 0.6 percent by weight of Platinum, 0.7 percent by weight of Chlorine on eta alumina support.
Reaction Conditions:
 Pressure, p.s.i.g., 200.
 Liquid Hourly Space Velocity, v./hr./v., 1.0.
 Hydrogen-to-naphtha mol ratio, 11 to 12:1.

A (Virgin Catalyst)

| Days on stream | 5 | 15 | 30 | 75 | 85 | 105 | 138 |
|---|---|---|---|---|---|---|---|
| $NH_3$ in Naphtha, p.p.m. by wt | Nil | Nil | Nil | Nil | Nil | Nil | Nil |
| Yields: | | | | | | | |
| $C_{6+}$ Percent charge | 61.5 | 58.5 | 58.0 | 55.0 | 54.5 | 54.5 | -------- |
| $H_2$, s.c.f./b | 930 | 850 | 700 | 660 | 620 | 590 | -------- |
| $H_2$, Purity, Mol Percent | 71 | 65 | 63 | 55 | 53 | 53 | -------- |
| $C_5$'s, vol. Percent charge | 9.5 | 9.5 | 10.0 | 10.0 | 10.0 | 10.0 | -------- |
| $C_4$'s, vol. Percent charge | 9.5 | 11.0 | 11.0 | 12.5 | 12.5 | 13.0 | -------- |
| $C_1$ to $C_3$ wt. Percent charge | 14.0 | 16.0 | 16.5 | 18.5 | 18.5 | 19.0 | -------- |

B (Regenerated Catalyst)

| Days on stream | 5 | 15 | 30 | 75 | 85 | 105 | 138 |
|---|---|---|---|---|---|---|---|
| $NH_3$ in naphtha, p.p.m. by wt.* | Nil | Nil | 6 | 7 | 7 | 10 | 11 |
| Yields: | | | | | | | |
| $C_{6+}$ Percent charge | 58.5 | 56.5 | 59.0 | 59.0 | 58.0 | 56.5 | 56.0 |
| $H_2$ s.c.f./b | 810 | 740 | 850 | 830 | 770 | 730 | 730 |
| $H_2$ Purity, Mol Percent | 67 | 64 | 67 | 66 | 63.5 | 60 | 59.5 |
| $C_5$'s, vol. Percent charge | 10.0 | 9.5 | 8.5 | 9.0 | 9.5 | 9.0 | 8.0 |
| $C_4$'s, vol. Percent charge | 11.0 | 12.0 | 10.5 | 11.0 | 11.5 | 11.5 | 12.5 |
| $C_1$ to $C_3$ wt. Percent charge | 15.0 | 17.0 | 16.0 | 16.0 | 16.5 | 17.5 | 18.0 |

*Pyridine added to charge mixture.

Upon examining the data presented in Table V, Section A, it will be found that in 10.5 days on stream (1) the yield on $C_{6+}$ reformate decreased from 61.5 to 54.5 percent, (2) the yield of hydrogen per barrel decreased from 930 to 590 s.c.f./b. and (3) the purity of the hydrogen dropped 71 to 53 mol percent. On the other hand, the data in Table V, Section B show that the yield of $C_6$ and heavier reformate was substantially unchanged, the yield of hydrogen per barrel increased and the purity of the hydrogen was substantially constant with the result that, after 138 days on-stream with the addition of ammonia and using a regenerated catalyst, the $C_{6+}$ yield, the purity of the produced hydrogen as measured by the mol percent of hydrogen in the reformer gas, i.e., the gas separated from the reformate at the liquid-gas separator.

While desiccated reforming (partial pressure of water less than 0.4 mm. Hg) at low pressures, less than 400 p.s.i.g. with the addition of at least 2 p.p.m. of ammonia has been discussed extensively hereinbefore, the addition of ammonia to the heavy paraffinic naphthas used as charge stocks in high pressure (400 to 700 p.s.i.g.) reforming provides similar advantages even when the partial pressure of water is as high as 5 to 20 mm. Hg. This is established by the data presented in Table VI.

TABLE VI

Section A

Charge Stock: Heavy Kuwait Naphtha BR: 190° to 365° F., 22.5 mol percent naphthenes.
Catalyst: 0.6 percent by weight of platinum, 0.7 percent by weight of chlorine on eta alumina support.

| Reactor | 1st | 2nd | 3rd |
|---|---|---|---|
| Relative Catalyst Fill | 0.5 | 1 | 1 |
| Pressure, p.s.i.g | | 500 | |
| Nitrogen Levels Naphtha Feed [1], p.p.m. wt | 0 | 0 | 0 |
| Reactor Influent, p.p.m. mol | 0 | 0 | 0 |
| Reactor Effluent, p.p.m. mol | 0 | 0 | 0 |
| Reaction Conditions LHSV, v./hr./v. (overall) | 1.0 | 1.0 | 1.0 |
| Hydrogen to Naphtha, mol ratio | 6/1 | 6/1 | 6/1 |
| Octane Severity, $C_{6+}$ (R+O) | 101.6 | 101.6 | 101.6 |

| Days on stream | 5 | 10 | 20 | 30 | 39 | 60 | 80 | 105 |
|---|---|---|---|---|---|---|---|---|
| Yields: | | | | | | | | |
| $C_{6+}$ Reformate, percent vol. of charge | 59.2 | 58.8 | 58.2 | 57.9 | 57.4 | 57.0 | 56.4 | 55.5 |
| $H_2$ production, s.c.f./bbl | 580 | 555 | 515 | 505 | 480 | 534 | 390 | 330 |
| $H_2$ in recycle gas, mol percent [1] | 62.5 | 61.0 | 60.0 | 58.7 | 57.7 | 55.2 | 53.0 | 50.0 |
| $C_5$'s percent vol. of charge | 11.0 | 11.0 | 11.0 | 11.0 | 11.0 | 10.8 | 10.4 | 10.0 |
| $C_4$'s percent vol. of charge | 11.3 | 11.3 | 11.3 | 11.3 | 11.3 | 11.3 | 11.3 | 11.3 |
| $C_1$ to $C_3$ percent wt. of charge | 16.6 | 16.8 | 17.2 | 17.8 | 18.0 | 18.5 | 19.0 | 19.3 |
| $\Delta C_{6+}$ Reformate, percent vol | Base | −0.4 | −1.0 | −1.3 | −1.8 | −2.2 | −2.8 | −3.7 |
| $\Delta H_2$ Produced, s.c.f./bbl | Base | −25 | −65 | −75 | −100 | −145 | −190 | −250 |
| $\Delta H_2$ in recycle gas, mol percent | Base | −1.5 | −2.5 | −3.8 | −4.8 | −7.3 | −9.5 | −12.5 |

Section B

Charge Stock: Heavy Kuwait Naphtha, BR: 250° to 365° F., 24.6 vol. percent Naphthenes.
Catalyst: 0.6 percent by weight of platinum, 0.7 percent by weight of chlorine on eta alumina support.

| Reactor | 1st | 2nd | | | 3rd | |
|---|---|---|---|---|---|---|
| Relative Catalyst Fill | 0.5 | 1 | | | 1 | |
| Pressure, p.s.i.g | | 500 | | | | |

| Nitrogen Levels Naphtha Feed [1], p.p.m. wt. [2] | 0 | 0 | 5 | 5 | 20 | 20 |
|---|---|---|---|---|---|---|
| Reactor Influent, p.p.m. mol | 0 | 0 | 4.3 | 3.8 | 13.7 | 10.6 |
| Reactor Effluent, p.p.m. mol | 0 | 0 | 1.7 | 2.8 | 5.3 | 5.4 |
| Reaction Conditions, LHSV, v./hr./v. | 1.2 | 1.2 | 1.2 | 1.2 | 1.2 | 1.2 |
| Hydrogen to Naphtha, mol ratio | 8/1 | 8/1 | 8/1 | 8/1 | 8/1 | 8/1 |
| Octane Severity, $C_{6+}$ (R+O) | 99.0 | 99.0 | 99.0 | 99.0 | 99.0 | 99.0 |

| Days on stream | 4 | 10 | 20 | 30 | 35 | 39 |
|---|---|---|---|---|---|---|
| Yields: | | | | | | |
| $C_{6+}$ Reformate, percent vol. of charge | 70.0 | 70.0 | 70.8 | 71.1 | 71.2 | 71.3 |
| $H_2$ Production, s.c.f./bbl | 650 | 650 | 720 | 720 | 720 | 720 |
| $H_2$ in recycle gas, mol percent [1] | 69.9 | 69.9 | 72.7 | 72.0 | 71.0 | 70.0 |
| $C_5$'s percent vol. of charge | 7.0 | 7.0 | 6.4 | 5.4 | 5.0 | 4.5 |
| $C_4$'s percent vol. of charge | 7.2 | 7.2 | 7.1 | 7.0 | 6.8 | 6.5 |
| $C_1$ to $C_3$ percent wt. of charge | 12.0 | 12.0 | 11.9 | 11.9 | 12.0 | 12.3 |
| $\Delta C_{6+}$ Reformate, percent vol | Base | 0 | +0.8 | +1.1 | +1.2 | +1.3 |
| $\Delta H_2$ Produced, s.c.f./bbl | Base | 0 | +70 | +70 | +70 | +70 |
| $\Delta H_2$ in recycle gas, mol percent | Base | 0 | +2.8 | +2.1 | +1.1 | +0.1 |

LHSV—Liquid Hourly Space Velocity.
[1] Naphtha feed and recycle gas stream dried with molecular sieve having pores 4–5 Angstroms in diameter.
[2] Pyridine added to charge mixture.

Upon examining the data presented in Table VI, Section A, it will be found that after thirty-nine days on stream at "desiccated" reforming conditions without nitrogen addition (1) the yield of $C_{6+}$ reformate decreased 1.8 percent (2) the yield of hydrogen per barrel decreased 100 s.c.f. and (3) the hydrogen content of the recycle gas dropped 4.8 mol percent. Furthermore, the selectivity of the catalyst continued to drop off with onstream time evidenced by the yields shown in Section A for 60, 80, and 105 days on stream.

On the other hand, with a similar paraffinic naphtha feed and approximately the same reforming conditions except that nitrogen as pyridine was added to the feed the data presented in Table VI, Section B, show that after thirty-nine days on stream (1) the yield of $C_{6+}$ reformate increased 1.3 percent (2) the yield of hydrogen per barrel increased 80 s.c.f. and (3) the hydrogen content of the recycle gas was essentially unchanged. Thus, from the data presented in Table VI it is manifest that the admixture of certain nitrogen-containing compounds to the feed (in this case, 5 to 20 p.p.m. wt. nitrogen based on naphtha) when reforming a paraffinic heavy naphtha at high pressure stabilizes the selectivity of the platinum-group metal reforming catalysts.

In more detail for the operation without nitrogen addition, a 180–365° F. paraffinic heavy naphtha was reformed over a platinum catalyst distributed in a 0.5:1:1 fill ratio in a three-adiabatic reactor system at a liquid hourly space velocity of 1.0 v./hr./v., 6/1 hydrogen to naphtha mol ratio and 101.6 (R+O)$C_{6+}$ reformate octane number severity. The naphtha feed and recycle gas streams were dried with 4A molecular sieves to give comparable conditions of dryness to those used for the "desiccated" reforming system previously described herein for the low pressure reforming studies of the effect of nitrogen on catalyst selectivity. In the high pressure study without nitrogen a $C_{6+}$ reformate with an octane rating of 101.6 (R+O) was maintained for 105 days at which point the run was concluded having reached an arbitrarily set vapor inlet temperature of 980° F. As mentioned earlier, based on the data presented in Table VI, section A, the selectivity of the catalyst in this system decreased steadily with on-stream time throughout the entire run. "Desiccated" reforming conditions as in the case of the low pressure reforming were chosen since the on-stream time is substantially increased over conditions where a "wet" system (naphtha feed dried only) is used.

The study made at high pressure reforming conditions with nitrogen added to the naphtha feed was made on a 250–365° F. paraffinic heavy naphtha fraction. Although the boiling range of this stock was slightly different from that which was used in the base case run (190–365° F.), the composition of this stock was quite similar as shown in the following table.

|  | Nitrogen Added | |
|---|---|---|
|  | Yes | No |
| Charge Stock Boiling Range, °F | 250–365 | 190–365 |
| PONA Analysis, Percent Vol.: |  |  |
| Paraffins+Olefins | 60.7 | 64.3 |
| Naphthenes | 24.6 | 22.5 |
| Aromatics | 14.7 | 13.2 |
| Total | 100.0 | 100.0 |

Other operating conditions for the study in which nitrogen was added to the feed such as level of dryness, space velocity, hydrogen to naphtha mol ratio, and octane severity were in the same general range as for the base case run in which no nitrogen was added to the reforming system. Thus, these two runs can be compared to show the effect of nitrogen addition on the selectivity of platinum-group metal catalyst for high pressure reforming of paraffinic heavy naphthas.

In reforming the 250–365° F. naphtha fraction, no nitrogen was added to the feed for the first fifteen days on stream in order to establish a yield base. Thereupon, 5 p.p.m. wt. nitrogen based on naphtha feed as pyridine was added between fifteen and thirty-three days on stream. During this period the reactor influent contained about 4 p.p.m. mol nitrogen and the reactor effluent about 2 p.p.m. mol nitrogen. At thirty-three days on stream, pyridine addition to the feed was increased to a 20 p.p.m. nitrogen level. Under these conditions, the nitrogen contents of the reactor influent and effluent increased to levels of 12 and 5 p.p.m. mol respectively.

It is also advantageous to add ammonia or compounds yielding ammonia under reforming conditions to the influent of the reforming zone, i.e., to the influent of the first reactor of a multireactor unit even operating at a reforming pressure in excess of 400 p.s.i.g. when the moisture content of the system when measured at the outlet of the zone, i.e., the effluent of the tail reactor of a multireactor unit is such that the partial pressure of water is greater than 0.4 mm. Hg say as much as 5 to 20 mm. Hg. This is established by the data presented in Table VII.

TABLE VII

Section A

Charge Stock: Heavy Kuwait Naphtha, BR: 190° to 365° F., 22.5 mol percent naphthenes Reaction Conditions

| Reactor | 1st | 2nd | 3rd |
|---|---|---|---|
| Relative Catalyst Fill | 0.5 | 1 | 1 |
| LHSV, v./hr./v |  | 1.0 |  |
| Hydrogen to Naphtha, mol ratio |  | 6/1 |  |
| Pressure, p.s.i.g |  | 500 |  |
| Octane Severity, $C_{6+}(R+O)$ |  | 101.6 |  |

| Days on stream | 3 | 10 | 20 | 30 | 40 | 45 | 50 |
|---|---|---|---|---|---|---|---|
| Nitrogen Levels: |  |  |  |  |  |  |  |
| Naphtha Feed, p.p.m. wt | 0 | 0 | 0 | 0 | 0 | 0 | 0 |
| Reactor Influent, p.p.m. mol | 0 | 0 | 0 | 0 | 0 | 0 | 0 |
| Reactor Effluent, p.p.m. mol | 0 | 0 | 0 | 0 | 0 | 0 | 0 |
| Yields: |  |  |  |  |  |  |  |
| $C_{6+}$ Reformate, percent vol. of charge | 59.2 | 58.7 | 58.0 | 57.0 | 56.5 | 56.2 | 56.0 |
| $H_2$ production, s.c.f./bbl |  | 460 | 460 | 460 | 460 | 460 | 460 |
| $H_2$ in recycle gas, mol percent |  | 66.5 | 66.1 | 65.4 | 64.3 | 63.6 | 62.8 |
| $C_5$'s percent vol. of charge |  | 10.9 | 10.6 | 10.2 | 10.0 | 9.8 | 9.7 |
| $C_4$'s percent vol. of charge | 11.2 | 12.6 | 12.6 | 12.6 | 12.6 | 12.6 | 12.6 |
| $C_1$ to $C_3$ percent wt. of charge | 12.6 | 15.3 | 16.1 | 17.0 | 17.7 | 18.3 | 18.7 |
| $\Delta C_{6+}$ Reformate, percent vol | 14.9 | −0.5 | −1.2 | −2.2 | −2.7 | −3.0 | −3.2 |
| $\Delta H_2$ Production, s.c.f./bbl | Base | 0 | 0 | 0 | 0 | 0 | 0 |
| $\Delta H_2$ in recycle gas, mol percent |  | Base | −0.4 | −1.1 | −2.2 | −2.9 | −3.7 |

Only naphtha dried with molecular sieve material having pores 4 to 5 Angstroms in diameter.

Section B

Charge Stock: Heavy Kuwait Naphtha, BR: 250° to 365° F., mol percent naphthenes.

Reaction Conditions

| Reactor | 1st | 2nd | 3rd |
|---|---|---|---|
| Relative Catalyst Fill | 0.5 | 1 | 1 |
| LHSV, v./hr./v |  | 1.2 |  |
| Hydrogen to Naphtha Mol Ratio |  | 8/1 |  |
| Pressure, p.s.i.g |  | 500 |  |
| Octane Severity, $C_{6+}(R+O)$ |  | 99.0 |  |

| Days on stream | 4 | 10 | 17 | 20 | 30 | 40 | 45 |
|---|---|---|---|---|---|---|---|
| Nitrogen Levels: |  |  |  |  |  |  |  |
| Naphtha Feed, p.p.m. wt.* | 0 | 16.21 | 2–3 | 2–3 | 2–3 | 0 | 0 |
| Reactor Influent, p.p.m. mol | 0 | 58.0 | 23.0 | 14.8 | 8.1 | 2.5 | 2.1 |
| Reactor Effluent, p.p.m. mol | 0 | 47.0 | 22.0 | 13.8 | 7.0 | 2.6 | 2.2 |
| Yields: |  |  |  |  |  |  |  |
| $C_{6+}$ Reformate, percent vol. of charge | 68.4 | 69.4 | 70.0 | 70.0 | 70.0 | 70.0 | 70.0 |
| $H_2$ production, s.c.f./bbl | 430 | 660 | 700 | 690 | 660 | 660 | 660 |
| $H_2$ in recycle gas, mol percent | 69.2 | 72.0 | 74.4 | 73.9 | 72.4 | 71.7 | 71.6 |
| $C_5$'s percent vol. of charge | 8.6 | 6.9 | 6.9 | 6.9 | 6.9 | 6.9 | 6.9 |
| $C_4$'s percent vol. of charge | 9.4 | 7.6 | 7.6 | 7.6 | 7.6 | 7.6 | 7.6 |
| $C_1$ to $C_3$ percent wt. of charge | 11.6 | 12.3 | 12.2 | 12.0 | 11.9 | 11.9 | 11.9 |
| $\Delta C_{6+}$ Reformate, percent vol | Base | +1.0 | +1.6 | +1.6 | +1.6 | +1.6 | +1.6 |
| $\Delta H_2$ production, s.c.f./bbl | Base | +230 | +270 | +260 | +230 | +230 | +230 |
| $\Delta H_2$ in recycle gas, mol percent | Base | +2.8 | +5.2 | +4.7 | +3.2 | +2.5 | +2.4 |

*Only naphtha dried with molecular sieve material having pores 4 to 5 Angstroms in diameter. Pyridine added to charge mixture.

The data obtained when only the naphtha was dried and no ammonia was admixed with the charge mixture provided a moisture level of the order of a partial pressure of water of 2.0 mm. Hg in the effluent of the tail reactor. It will be observed that in the absence of ammonia in fifty-six days on stream, the yield of $C_{6+}$ reformate decreased 3.2 percent. During the same on-stream period while the amount of hydrogen produced was substantially constant, nevertheless the purity of the hydrogen decreased about 3.7 mol percent.

When a somewhat similar paraffinic stock also was reformed at 500 p.s.i.g. but ammonia (as pyridine) was added to the charge mixture the yield of $C_{6+}$ reformate increased 1.6 percent in the first seventeen days on stream and the increased yield was maintained for the following twenty-eight days. The production of hydrogen increased during the first ten days on stream and the increased production of hydrogen was maintained during the rest of the on-stream period, i.e., for thirty-five days. Furthermore, the purity of the recycle hydrogen increased to a maximum at the seventeenth day on stream. While the purity then decreased at the end of the forty-five days on stream, the purity of the recycle hydrogen was still 2.4 mol percent higher than the base when no ammonia was mixed with the reaction vapors.

Illustrative of the characteristics of Mid-Eastern naphthas are the following data:

stream at total reaction zone pressure less than 700 p.s.i.g. and preferably in the range of 100 to 600 p.s.i.g. and especially in the range of about 200 to 500 p.s.i.g. The vapor inlet temperature(s) is in the range of 900 to 1050° F. dependent upon the activity of the reforming catalyst in the presence of said nitrogen-containing compound, the liquid hourly space velocity, and the octane rating (Research+3 cc. TEL) of the stabilized reformate.

Those skilled in the art will also recognize that the present invention provides for stabilizing the selectivity of platinum group metal reforming catalyst at pressures in excess of 400 p.s.i.g. and at partial pressures of water vapors of the reforming zone in excess of 0.4 mm. of mercury and as high as 2 to 5 to 20 mm. of mercury in which the moisture content of at least one of the charge naphtha, the hydrogen-containing recycle gas, and the platinum group reforming catalyst is regulated to maintain the partial pressure of water vapor in reforming zone in excess of 0.4 mm. of mercury and in the range of 2 to 20 and particularly 2 to 5 mm. of mercury. The selectivity of the platinum group metal reforming catalyst on a refractory oxide support and acid sites is stabilized by admixing with the influent of the reforming zone at least one and preferably at least 10 and especially 10 to 15 p.p.m. of ammonia by weight based on charge naphtha. When ammonia is admixed with the influent of the reforming zone as described hereinbefore, the selectivity

| Boiling Range of Fraction | IBP–190° F. | IBP–190° F. | 190°–365° F. | 365° F.+ |
|---|---|---|---|---|
| Percent Volume of Full Boiling Range Naphtha Distillation, ASTM° F.: | 100 | 18.4 | 65.5 | 16.1 |
| IBP | 104 | 80 | 182 | 369 |
| 10% vol | 160 | 94 | 219 | 386 |
| 50% vol | 276 | 108 | 269 | 394 |
| 90% vol | 366 | 138 | 336 | 409 |
| EBP | 408 | 165 | 364 | 440 |
| Octane Number: | | | | |
| Research, clear | | 39.8 | 74.7 | 36.0 | 9.0 |
| Research+3 cc. TEL | | 66.6 | 91.5 | 66.0 | 39.0 |
| $C_{6+}$ Components: | | | | |
| Paraffins, mol percent | | | 87.8 | 64.3 | 54.2 |
| Mono olefins, mol percent | | | | | |
| Naphthenes | | | 2.8 | 22.5 | 23.5 |
| Aromatics | | | 9.4 | 13.2 | 22.3 |

Thus it is manifest that the addition of nitrogen compounds, which under reforming conditions of temperature, pressure, and liquid hourly space velocity in the presence of platinum-group metal reforming catalyst and hydrogen yield ammonia, to the influent of a reforming zone, i.e., the influent of the first reactor of a multireactor reforming unit stabilizes the platinum-group metal reforming catalyst when the partial pressure of water in the tail reactor effluent or reforming zone effluent is as high as 2 to 5 to 20 mm. Hg at 500 p.s.i.g.

From the foregoing description of the present invention those skilled in the art will recognize that the present invention provides a means of stabilizing the selectivity of platinum-group metal reforming catalyst which comprises regulating the moisture content of at least one of charge naphtha, the hydrogen-containing recycle gas, and the platinum-group metal reforming catalyst to maintain a partial pressure of water vapor in the final effluent of the reaction zone, i.e., the effluent of the tail reactor of a reaction zone having a plurality of reactors, less than 0.4 and preferably in the range of 0.05 to 0.2 millimeter of mercury and admixing with the influent vapors of said reaction zone, i.e., the influent of the head reactor of a reaction zone having a plurality of reactors a nitrogen-containing compound yielding ammonia in the presence of said platinum-group metal reforming catalyst and hydrogen, preferably without also yielding water, in amount sufficient to supply at least 2 and preferably at least 10 p.p.m. of ammonia by weight based on the charge naphtha. In a unit having a plurality of reactors all of the reactors normally being on of the platinum group metal reforming catalyst of the class described hereinbefore is stabilized when reforming is carried out in excess of 400 p.s.i.g., the temperature in the range of 900 to 1050° F. depending upon the activity of the reforming catalyst in the presence of the admixed nitrogen-containing compound at a hydrogen mol ratio in the range of 3 to 15 and a liquid hourly space velocity depending upon the activity of the reforming catalyst and the predetermined octane rating of the stabilized reformate.

What is claimed is:

The method of stabilizing the selectivity of platinum-group metal reforming which comprises for at least 90 days contacting conditioned platinum-group metal reforming catalyst comprising platinum-group metal on refractory oxide support having acid sites with charge naphtha containing innocuous concentrations of not more than 20 p.p.m. of sulfur, not more than 1 p.p.m. nitrogen and not more than $1/10^9$ parts of arsenic at least fifteen percent by volume of naphthenes in the presence of hydrogen-containing gas in a reforming zone comprising a plurality of reactors, at a pressure in excess of 400 p.s.i.g., maintaining a partial pressure of water in excess of 0.4 mm. Hg but not greater than about 20 mm. of Hg as measured in the effluent of the tail reactor, admixing at least one nitrogen compound yielding ammonia under said reforming conditions at the rate of at least 2 p.p.m. by weight of ammonia based upon the charge naphtha, said hydrogen-containing gas being present in the ratio of about three to about twenty mols of hydrogen per mol of charge naphtha, employing a reforming temperature in the range of about 900° to about 1,050° F. and a liquid hourly space velocity in the range of 0.5 to 2.

References Cited

UNITED STATES PATENTS

| | | | |
|---|---|---|---|
| 2,872,492 | 2/1959 | Donaldson et al. | 208—141 |
| 2,906,699 | 9/1959 | Haensel et al. | 208—141 |
| 2,952,611 | 9/1960 | Haxton et al. | 208—65 |
| 2,955,080 | 10/1960 | Carter | 208—141 |
| 2,971,902 | 2/1961 | Blome et al. | 208—141 |

DELBERT E. GANTZ, *Primary Examiner.*

ALPHONSO D. SULLIVAN, *Examiner.*

H. LEVINE, *Assistant Examiner.*

UNITED STATES PATENT OFFICE
CERTIFICATE OF CORRECTION

Patent No. 3,347,782                        October 17, 1967

Leon M. Capsuto et al.

It is hereby certified that error appears in the above numbered patent requiring correction and that the said Letters Patent should read as corrected below.

Column 3, line 7, after "having a sup-" insert -- port comprising refractory oxide having acid sites is --; columns 3 and 4, TABLE II, seventh column, line 2 thereof, for "707" read -- 770 --; TABLE III, in the heading, for "$C_1$" read -- $C_6$ --; column 6, line 52, for "0.5 2" read -- 0.5 to 2 --; column 8, line 36, for "exces" read -- excess --; column 12, line 27, for "selectively" read -- selectivity --; columns 13 and 14, TABLE VI section A, column 60, line 2 thereof, for "534" read -- 435 --.

Signed and sealed this 19th day of November 1968.

(SEAL)
Attest:

EDWARD M. FLETCHER, JR.                      EDWARD J. BRENNER
Attesting Officer                             Commissioner of Patents